Patented Nov. 3, 1942

2,300,998

UNITED STATES PATENT OFFICE 2,300,998

AROMATIC NITROGEN-CONTAINING HYDROXY COMPOUNDS

Ellis R. White, Albany, and Ernest L. Walters, San Francisco, Calif., assignors to Shell Development Company, San Francisco, Calif., a corporation of Delaware No Drawing. Application June 27, 1940, Serial No. 342,690

8 Claims. (Cl. 260—566)

The present invention relates to a novel class of compounds comprising certain aromatic nitrogen-containing hydroxy compounds.

Many organic substances such as refined and semi-refined hydrocarbon oils, animal fats and oils, vegetable fats and oils, soaps, photographic developers, natural and synthetic sulphonated and sulphated oils, essential oils, perfumes, resins, and the like, deteriorate upon exposure to the atmosphere over periods of time, this deterioration being due to oxidation which is usually catalyzed by the presence of or by contact with certain oxidation promoters, particularly metal oxidation promoters, such as iron, copper, chromium, cobalt, lead, and compounds of copper. chromium cobalt and lead. It has been previously suggested to reduce the susceptibility of organic substances to oxidation induced by the presence of copper, by adding to the organic substances certain deactivators which tend to render the copper inactive, this addition of such deactivators, for example, reducing the gum formation in the presence of dissolved copper as determined by the A. S. T. M. air jet method and also increasing the induction period as tested by the Voorhees and Eisinger method described in S. A. E. J. 24, 584 (1929). The deactivators known and used heretofore, however, are costly, difficult to prepare and/or possess relatively low oxidation suppressing qualities. In this connection, it must be noted that the value of compounds as deactivators and suppressors of oxidation due to catalytic activity of metals are usually estimated by measuring the activities under at least two conditions, namely, before and after oxidation. For example, as applied to gasoline, this value of a metal deactivating compound is determined by first measuring the extent to which the compound overcomes the adverse effect of the metal in lowering the induction period, then determining the extent to which the compound reduces the initial copper dish gum value of the gasoline, and lastly, the extent to which it maintains low copper dish gum value after accelerated oxidation.

It is an object of the present invention to provide a new class of compounds which are particularly suitable as metal deactivators and which may be added to different types of organic substances to protect them from the catalytic effect of metal oxidation promoters. It is a further object of the invention to provide such new class of compounds which may be readily and relatively simply prepared and which possess high metal deactivating or oxidation suppressing characteristics. A still further object is to provide a class of compounds which may be employed as intermediates for the manufacture of a variety of other chemical compounds.

It has now been discovered that these desirable properties are possessed by aromatic nitrogen-containing hydroxy compounds having the general formula

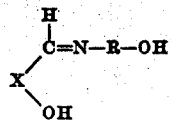

wherein X is an aryl radical to which the hydroxyl radical and the nitrogen-containing radical are directly attached in ortho position, and wherein R is an aliphatic radical which may contain a nitrogen atom in the chain. This class of compounds possesses the property of deactivating metallic copper, chromium, lead, cobalt, iron and compounds of copper, chromium, lead and cobalt. Many of these compounds retain their activity after exposure to oxidizing influences.

Although the aromatic nitrogen-containing hydroxy compounds comprising the novel class may be obtained by other methods and from other starting or primary materials, the preferred method of obtaining such compounds is by reacting one mol of an aromatic ortho-hydroxy substituted aldehyde with one mol of a hydroxy alkyl amine of the general formula $NH_2$—R—OH, wherein R is an aliphatic radical devoid of elements other than carbon, hydrogen and nitrogen, under conditions to eliminate water by the interaction of the carbonyl radical of the aldehyde and of the primary amine radical of the hydroxy alkyl amine. The novel class of compounds may be also said to comprise the products obtained by the reaction of equi-molecular portions of an aromatic aldehyde having a hydroxyl radical in ortho position to the carbonyl radical and of a hydroxy alkyl amine of the above defined formula $NH_2$—R—OH. The R of this hydroxy alkyl amine represents an aliphatic radical which consists of carbon and hydrogen atoms, and may also contain one or more nitrogen atoms. In the preferred group, this aliphatic radical consists of a saturated aliphatic hydrocarbon radical which may be discontinuous in the sense that a secondary nitrogen group may be disposed therein and be attached directly to two adjacent carbon atoms.

In view of what was said above, the reaction products obtained by the condensation of aromatic ortho-hydroxy substituted aldehydes and of hydroxy alkyl amines which have one primary amine radical and at least one hydroxyl radical, which radicals are attached to open-chain organic radicals devoid of elements other than carbon, hydrogen and nitrogen, are included within the scope of the present invention. When a nitrogen atom is present in the open-chain organic radical of the hydroxyl alkyl amine, such nitrogen atom is preferably present as a secondary nitrogen attached directly to two adjacent carbon atoms. In such a case, the organic radical, carrying the primary amine and hydroxyl radical, may consist of two aliphatic hydrocarbon radicals attached to each other by a secondary nitrogen group.

Representative members of the aromatic ortho-hydroxy substituted aldehydes employed for the production of the novel class of compounds, include salicylaldehyde, the homo-salicylaldehydes, trimethyl salicylaldehyde, isobutyl salicylaldehyde, ortho-hydroxy substituted naphthyl aldehyde, ortho-hydroxy substituted anthryl aldehyde, and the like, and their homologues and analogues, together with suitable substituted compounds thereof, the substituted radicals including alkyl, halogen, amino, imino, hydrazine, ether and thio-ether radicals, and the like, which may take the place of one or more of the hydrogens attached directly to the ring carbon atoms.

As to the hydroxy alkyl amines, these compounds, as stated, possess the general formula $NH_2$—R—OH, wherein R is an aliphatic radical devoid of elements other than carbon, hydrogen and nitrogen, the latter, if present, being preferably in the form of a secondary nitrogen group attached to two adjacent carbon atoms of the open chain R. Representative examples of the hydroxy alkyl amines include mono-ethanol amine, mono-propanol amine, mono-butanol amine, mono-dodecanol amine, 1-amino-2-pentanol, 4-amino-2-pentanol, ethanol ethylene diamine, propanol ethylene diamine, ethanol propylene diamine, and the like, and their homologues and analogues. Of the above, the hydroxy alkyl amines containing a secondary nitrogen group in the open chain are preferred since the products obtained by the reaction thereof with the aromatic ortho-hydroxy substituted aldehydes, such as salicylaldehyde, are found to be excellent metal deactivators and/or oxidation suppressors.

As examples of the members of the new class of compounds, reference is made to salicylal ethanol amine, salicylal propanol amine, salicylal dodecanol amine, salicylal ethanol ethylene diamine, salicylal propanol ethylene diamine, and the like, and their naphthyl and anthryl homologues in which the alkanol amino group is attached in ortho-position to the hydroxy radical, such as beta hydroxy beta' naphthylal ethanol amine.

As stated, the aromatic nitrogen-containing hydroxy compounds of the new class may be prepared by an interaction of the aromatic ortho-hydroxy substituted aldehyde with the hydroxy alkanol amine under conditions whereby the oxygen of the aldehyde-characterizing group of the aromatic compound and the two reactive hydrogen atoms of the primary amino group of the hydroxy alkyl amine split off to form water. The condensation product resulting from the combining of the remaining radicals constitutes the novel aromatic nitrogen-containing hydroxy compound. Since this reaction is exothermic in character it is necessary or at least advisable to cool the reactants. This may be effected by any of the well known means. One efficient method is to effect the reaction in the presence of an organic diluent or solvent which may act as a heat-extracting medium. If it is desired to obtain the novel compound or compounds in a pure anhydrous state and since water is formed during the condensation reaction, it may be advisable to employ a diluent or solvent which forms a constant boiling mixture with the water, so that the latter may be readily separated by azeotropic distillation without decomposition of the desired reaction product or products. Although various organic compounds may be employed for this purpose, it was found that the use of benzene gives excellent results, this benzene acting both as the heat extracting medium during the condensation reaction and as the entraining or azeotropical agent for the separation of the water. Obviously, other methods of cooling, such as the use of acetone-ice baths, as well as other dehydrating methods may be employed.

The following examples are given for illustrative purposes only:

EXAMPLE I

Salicylaldehyde was cooled to about —7° C. and was intimately commingled with an equimolecular quantity of ethanol amine. The reaction, being exothermic in character, was effected in a container disposed in an acetone-ice bath. After termination of the reaction, which was indicated by a lowering of the temperature of the reaction product, the mixture was distilled to remove water formed as a by-product. A clear, yellow liquid, soluble in water and boiling at 150° C. at 2 mm. of mercury pressure, was obtained. An analysis showed that this liquid was salicylal mono-ethanol amine having the formula

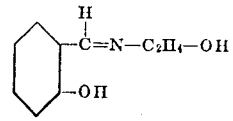

The same product was also obtained by commingling equimolecular proportions of salicylaldehyde and ethanol amine with about 500 volume percent of benzene which latter moderated the condensation reaction by acting as a heat extracting agent. After completion of reaction, the mixture was subjected to distillation, the water being removed as a constant-boiling binary mixture with the benzene at a temperature of about 69° to 70° C. The excess benzene was then driven off, and the remaining yellow liquid comprised the salicylal mono-ethanol amine.

EXAMPLE II

The novel compound N salicylal N' ethanol ethylene diamine was prepared in the following manner. Equimolecular quantities of salicylaldehyde and ethanol ethylene diamine $$(NH_3—C_2H_4—NH—C_2H_4—OH),$$

together with about 500 volume percent of benzene, were intimately commingled, the mixture being externally cooled if necessary to remove the heat of reaction. Thereafter, the water formed during the condensation reaction was removed in the form of an azeotropic binary mixture with benzene. When all of the water was thus recovered, the remaining mixture or solution was cooled whereupon microscopic yellow monoclinic needles precipitated. This solid had a melting point of 90° C. and was found to have the formula

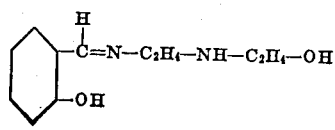

Example III

In order to illustrate the utility of the new class of compounds and the high metal deactivating characteristics thereof as compared to those of the seemingly closely related salicylal alkyl amines, salicylal phenyl hydrazones, and the like, the following tests were made. To show the property of suppressing the catalytic activity for example of copper, the various salicylal derivatives shown below were added in small quantities to a gasoline containing no copper and to a gasoline containing 1 part per million of dissolved copper added as copper phenyl propionate. The induction periods were then determined by the Voorhees and Eisinger methods described in S. A. E. J. 24, 584 (1929). The results are shown in the following table:

Table I

| Deactivator added (2.5 mg./100 ml. gasoline) | Induction period (in hours) | |
|---|---|---|
| | No added copper | Copper added (1 part per million) |
| None | 4.67 | 1.58 |
| Salicylal ethyl amine | 4.83 | 2.50 |
| Salicylal alpha-methyl phenyl hydrazone | 4.83 | 1.42 |
| Salicylal ethanol amine | 4.93 | 3.25 |
| N salicylal N' ethanol ethylene diamine | 5.25 | 4.50 |

Table II shows the deactivation effects of salicylal ethyl amine and of N salicylal N' ethanol ethylene diamine on the induction periods and the copper dish gum content before and after oxidation of another gasoline.

Table II

| Deactivator added (25 mg./100 ml. gasoline) | Induction period (in hrs.) | | Copper dish gum (mg./100 ml.) | |
|---|---|---|---|---|
| | No copper | Copper added 1 part per million | Initial | After 1 hr. accelerated oxidation |
| None | 4.67 | 1.58 | 72, 82 | 128, 146 |
| Salicylal ethyl amine | 4.83 | 2.50 | 75, 92 | 233, 212 |
| N salicylal N' ethanol ethylene diamine | 4.92 | 4.50 | 7.6 | 8.7 |

The above examples show that the novel aromatic nitrogen-containing hydroxy compounds described herein possess high metal deactivating properties. These compounds also retain the ability to suppress the copper dish gum to the original low concentration even after exposure to oxidation conditions. These properties as shown in the tables, are much higher than those of the seemingly closely related corresponding salicylal alkyl amines and salicylal phenyl hydrazones—a fact which is quite surprising and wholly unpredictable. The same is true of the other aromatic nitrogen-containing hydroxy compounds of the above-defined and hereinbelow claimed class.

We claim as our invention:

1. N-salicylal mono ethanol amine.
2. N-salicylal N' ethanol ethylene diamine.
3. An aromatic nitrogen-containing hydroxy compound having the formula

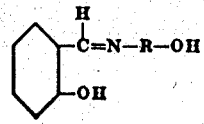

wherein R is an open chain organic group selected from the class consisting of saturated aliphatic hydrocarbon radicals and saturated aliphatic hydrocarbon radicals containing a secondary nitrogen group in the chain, the nitrogen atom of said secondary nitrogen group being attached to two carbon atoms devoid of a direct interlinkage between themselves.

4. An aromatic nitrogen-containing hydroxy compound having the formula

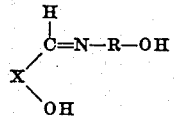

wherein X is an aryl radical to which the OH radical and the nitrogen-containing radical are directly attached in ortho position, and wherein R represents a saturated acyclic hydrocarbon radical.

5. An aromatic nitrogen-containing hydroxy compound having the formula

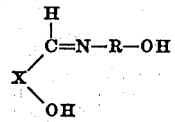

wherein X is an aryl radical to which the OH radical and the nitrogen-containing radical are directly attached in ortho position, and wherein R represents a saturated acyclic hydrocarbon radical containing a secondary nitrogen which is attached to two carbon atoms which are devoid of a direct interlinkage between themselves.

6. An aromatic nitrogen-containing hydroxy compound having the formula

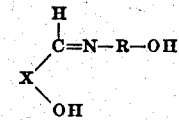

wherein X is an aryl radical to which the OH radical and the nitrogen-containing radical are directly attached in ortho position, and wherein R is an open chain organic group selected from the class consisting of aliphatic hydrocarbon radicals and saturated aliphatic hydrocarbon radicals containing a secondary nitrogen group in the chain, the nitrogen atom of said secondary nitrogen group being attached to two carbon atoms devoid of a direct interlinkage between themselves.

7. The compounds of the general formula:

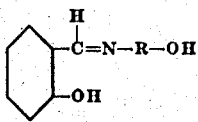

wherein R is a saturated aliphatic hydrocarbon radical.

8. The compounds of the general formula:

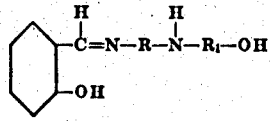

wherein R and R₁ are saturated aliphatic hydrocarbon radicals.

ELLIS R. WHITE.
ERNEST L. WALTERS.